(12) United States Patent
Sensenig (10) Patent No.: US 7,810,450 B2
(45) Date of Patent: Oct. 12, 2010

(54) GATE FOR DOMESTIC FARM ANIMALS, AN AUTOMATED MILKING FACILITY INCLUDING SUCH A GATE, AND METHOD OF TRAINING DOMESTIC FARM ANIMALS TO USE SUCH A GATE

(76) Inventor: Luke G. Sensenig, 255 Holtzman Rd., Reinholds, PA (US) 17569

( * ) Notice: Subject to any disclaimer, the term of this patent is extended or adjusted under 35 U.S.C. 154(b) by 860 days.

(21) Appl. No.: 11/620,192

(22) Filed: Jan. 5, 2007

(65) Prior Publication Data
US 2008/0163819 A1 Jul. 10, 2008

(51) Int. Cl.
*A01J 3/00* (2006.01)
*A01J 5/00* (2006.01)
(52) U.S. Cl. .................................. 119/14.03
(58) Field of Classification Search .............. 119/14.03, 119/426, 436, 524; 49/197, 198, 104, 116
See application file for complete search history.

(56) References Cited

U.S. PATENT DOCUMENTS

| | | | | |
|---|---|---|---|---|
| 3,349,751 A | * | 10/1967 | Frostad | 119/703 |
| 3,415,227 A | * | 12/1968 | Welsh | 119/524 |
| 3,785,346 A | * | 1/1974 | Dower | 119/524 |
| 4,006,714 A | * | 2/1977 | Goossen | 119/510 |
| 5,285,746 A | * | 2/1994 | Moreau | 119/14.03 |
| 5,584,261 A | | 12/1996 | Hart et al. | |
| 5,957,089 A | * | 9/1999 | Stoneman | 119/524 |
| 6,000,364 A | * | 12/1999 | Bens | 119/510 |
| 6,186,093 B1 | | 2/2001 | Finn et al. | |
| 7,137,357 B2 | * | 11/2006 | Mayne | 119/704 |
| 2006/0065209 A1 | * | 3/2006 | May et al. | 119/502 |

* cited by examiner

*Primary Examiner*—Michael R Mansen
*Assistant Examiner*—Monica Williams
(74) *Attorney, Agent, or Firm*—Lowe Hauptman Ham & Berner LLP (57) ABSTRACT

Cows are milked at a facility including a robotic milker, a pen, a first passage leading from the pen to the milker, and a second passage leading from the milker to the pen. Each passage includes a one-way gate. Each gate includes a barrier that turns about a horizontal axis from a quiescent position in only a first direction in response to the cows pushing against the barrier and turns in the opposite direction about the axis to the quiescent position after each cow has passed through the barrier. The barrier includes plural tines that turn independently of each other about the axis in both directions. In normal operation, the quiescent position of the tines is vertical. For training, the quiescent position of the tines is displaced from the vertical so the tines are above the heads of the animals but below their backs.

11 Claims, 8 Drawing Sheets

GATE FOR DOMESTIC FARM ANIMALS, AN AUTOMATED MILKING FACILITY INCLUDING SUCH A GATE, AND METHOD OF TRAINING DOMESTIC FARM ANIMALS TO USE SUCH A GATE

FIELD OF THE INVENTION

The present invention relates generally to one-way gates for domestic animals and, more particularly, to such a gate having a barrier that turns about a horizontal axis from a quiescent position in only a first direction in response to the animal pushing against the barrier and turns about the horizontal axis in a second, opposite direction, to the quiescent position, after the animal has passed through the barrier.

BACKGROUND ART

Figure 1:
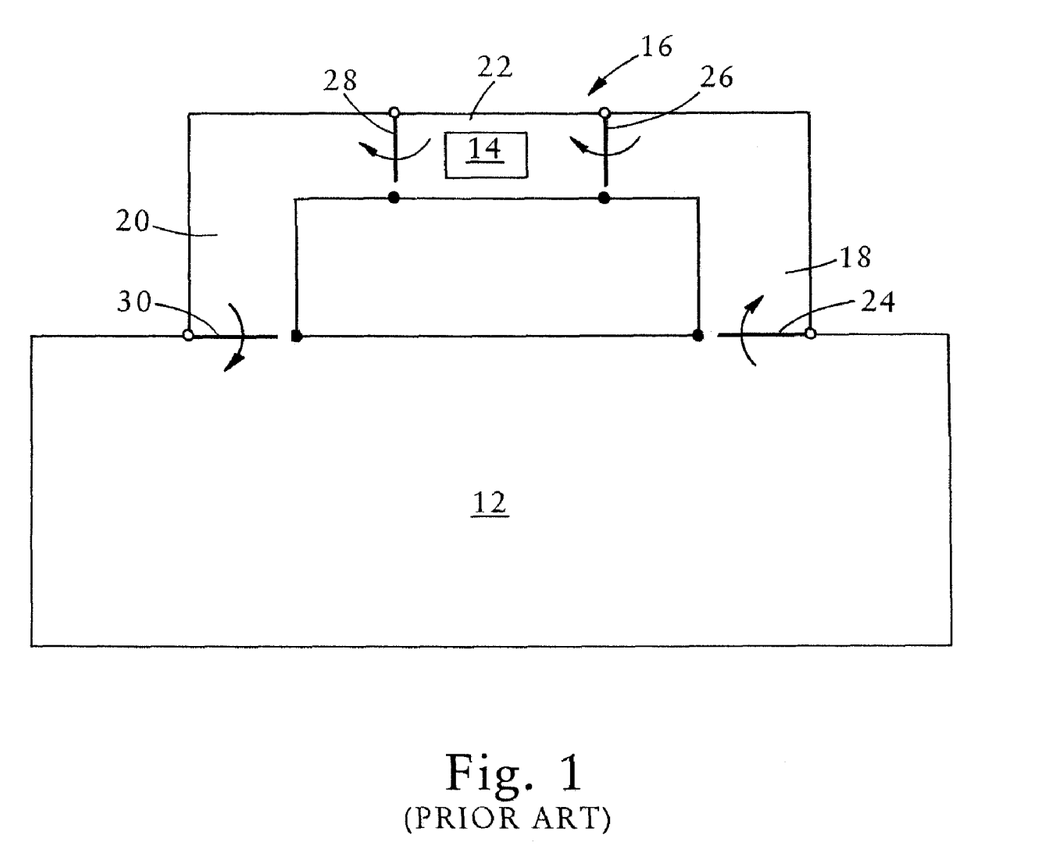
FIG. 1, as described, is a prior art system including a cow pen, several one-way gates and a robotic milker.

A prior art system for automatically milking cows, and is probably adaptable for use with other mammals that are milked, is illustrated in FIG. 1 as including cow pen 12 where the cows spend most of their day, eating, sleeping, eliminating and chewing their cud. The cows have been trained so that, from time to time (when their bags are full and the cows need to be milked), they leave cow pen 12 and go to robotic milker 14 that is located in passage 16, including entry portion 18, exit portion 20 and milking portion 22, where robotic milker 14 is located.

The cows in pen 12 access robotic milker 14 by pushing open one way barriers of gates 24 and 26; gate 24 is between pen 12 and entry portion 18 of passage 16, while gate 26 is between entry portion 18 and milker portion 22 of passage 16. After the cows have been milked by robotic milker 14, the cows return to pen 12 by pushing open a one way barrier of gate 28 between milking portion 22 and exit portion 20 of passage 16 and by pushing open a one way barrier of gate 30 between exit portion 20 and pen 12. While a cow is being milked by robotic milker 14, she is prevented from leaving milking portion 22 because gates 26 and 28 are locked closed. Gates 26 and 28 can be opened by the cows pushing against a barrier of the gates upon completion of the milking process.

Because each of gates 24, 26, 28 and 30 has a one-way barrier, the cow is supposed to be able to only walk from pen 12 into entry area 18, thence to milking area 20, thence back to pen 12 by way of gates 28 and 30 and exit portion 20 of passage 16. The barriers of gates 24, 26, 28 and 30, in the prior art arrangement, are typically spring biased to open in only one direction so that the barriers pivot about vertical axes in response to the cows pushing against the gates.

A problem with the prior art arrangement is that many of the cows can not be trained to push the barriers of gates 24, 26 and 30 to the open position. In addition, some cows are able to open the barriers of the prior art gates in a direction opposite to the desired direction by pushing against the spring biased barriers with sufficient force. Hence, the prior art system of FIG. 1 has been found to function satisfactorily for only a relatively small percentage of cows. The prior art gates also are relatively expensive to build and maintain because of initial and replacement costs associated with the springs that have a tendency to wear.

U.S. Pat. No. 5,584,261, Hart et al., discloses a dairy parlor gate that is pivotable about a horizontal axis. The gate is made of a non-electrically conductive material that does not interfere with an electromagnetic field generated by an electronic identification system for use with animal-worn transponders. Sensors responsive to the transponders activate a motor that causes the gate to pivot about the horizontal axis, to enable the cow to gain access to a milking area. Possible problems with this system are that the non-electrically conductive materials in the gate appear to be relatively expensive, as is the motorized system for driving the gate about its horizontal axis. In addition, because a cow approaching the sensor is likely to be moving as the transponder moves past the sensor, there is a high probability of the sensor not sensing the transponder adequately. Consequently, the reliability of the motorized automated system to enable cows to move through the gate is likely to be reduced.

It is, accordingly, an object of the present invention to provide a new and improved gate for farm animals.

Another object of the invention is to provide a new and improved gate for enabling farm animals to move in only one direction from a pen to a destination location, e.g., a robotic milker, wherein the gate is relatively inexpensive.

A further object of the invention is to provide a new and improved gate for enabling farm animals to move in only one direction from a pen to a destination location, e.g., a robotic milker, wherein the gate is constructed so that the farm animals can more reliably open the gate as the animals move toward the destination location.

An additional object of the invention is to provide a new and improved gate for enabling farm animals to move in only one direction from a pen to a destination location, e.g., a robotic milker, wherein the gate includes an arrangement for facilitating training of the animals to use the gate.

An added object of the invention is to provide a new and improved automated milking facility wherein animals to be milked move in only a single direction through highly reliable one way gates that the animals are easily trained to walk through.

Yet another object of the invention is to provide a method of training farm animals to push open one way gates that swing about horizontal axes.

SUMMARY OF THE INVENTION

In accordance with one aspect of the invention, a gate for domestic farm animals includes a support and a barrier for the animals carried by the support. The support and barrier are arranged for enabling the barrier to turn about a horizontal axis from a quiescent position in only a first direction in response to the animal pushing against the barrier and to turn in a second direction, opposite to the first direction, about the horizontal axis to the quiescent position after the animal has passed through the barrier.

In accordance with another aspect of the invention, gates of the type described in the previous paragraph are employed in a milking facility for domestic farm animals, wherein the facility includes a milking area, a pen area, a first passage leading from the pen area to the milking area, and a second passage leading from the milking area to the pen area. The first passage includes a first of the gates, while the second passage includes a second of the gates. The first passage and the first gate are arranged so that the animals must walk through the first gate in order to get from the pen area to the milking area. The second passage and second gate are arranged so that the animals must walk through the second gate in order to get from the milking area back to the pen area. The gates are constructed so the animals can not walk from the milking area to the pen through the first gate and can not walk from the pen to the milking area through the second gate.

A further aspect of the invention relates to a method of training a domestic farm animal to walk through a one-way gate having a barrier that in a normal, non-training mode: (a) the barrier has a quiescent position in a vertical plane and turns in a first direction about a horizontal axis in response to the animal pushing against the barrier, and (b) the gate turns in a second direction about the horizontal axis so it again has a quiescent position in the vertical plane after the animal has walked through the gate. The method comprises turning the barrier in the first direction to an angle removed from the vertical plane so that as the animal approaches and initially pushes against the gate the barrier does not contact the head of the animal, but contacts the back of the animal. After the animal has walked through the gate with the barrier in the turned position a sufficient number of times that the animal willingly walks through the gate, the barrier is positioned so the plane of the barrier has a quiescent position in the vertical plane.

The barrier is preferably initially at a first large angle relative to the vertical plane. After the animal has walked through the gate with the barrier at the first angle a sufficient number of times that the animal willingly walks through the gate, the barrier is positioned at a second angle relative to the vertical plane; the second angle being less than the first angle. After the animal has walked through the gate with the barrier at the second angle a sufficient number of times that the animal willingly walks through the gate, the barrier is positioned in the vertical plane.

In normal operation, i.e., a non-training mode, the horizontal axis and the barrier are preferably arranged so that the animals can walk through the barrier while moving their legs in a normal walking manner. In the non-training mode, the barrier has a bottom portion positioned such that the heads of the animals can pass under the bottom portion only as a result of the animals ducking their heads lower than the usual positions thereof. It has been found that these geometric considerations enable cows to easily move through the gates when the cows want to be milked because their bags are full and after they have been milked, e.g. by a robotic milker.

The barrier preferably includes plural equal length tines that turn independently of each other in the first and second directions about the axis. Pads at the free ends of the tines prevent the animals from being injured by the tines as the tines contact the animals.

The tines are preferably horizontally displaced relative to each other so that a first of the tines contacts central portions of the backs of the animals as the animals pass through the gate and second and third of the tines respectively contact portions of the backs of the animals located on opposite sides of the central portions of the backs of the animals as the animals pass through the gate.

The one way action of the gate is preferably provided by employing a horizontally mounted bar that the tines engage while in all of the quiescent positions. The bar prevents turning of the tines about the horizontal axis in the second direction from the quiescent position.

For training purposes, the bar is preferably selectively turnable to plural vertical positions relative to the axis for controlling the angle of the quiescent position relative to the vertical positions of the tines. To enable the bar to be at plural quiescent angles for training purposes, the bar carries a horizontally displaceable spring loaded pin for selectively engaging openings in a fixed, vertically disposed plate. The openings are at angles corresponding to the plural angles of the quiescent position.

The above and still further objects, features and advantages of the present invention will become apparent upon consideration of the following detailed description of a specific embodiment thereof, especially when taken in conjunction with the accompanying drawings.

DETAILED DESCRIPTION OF THE DRAWINGS

The gate 40, illustrated in FIGS. 2-10, has a barrier that swings about a horizontal axis in response to a cow pushing against the barrier, and replaces gates 24, 26, 28 and 30, FIG. 1, that swing about a vertical axis. The gate 40 illustrated in FIGS. 2-10 is arranged so that cows can be easily trained to go through the gate. Because the gate 40 of FIGS. 2-10 turns in response to a cow pushing against the gate, the need for a transponder and sensor and for motors, as disclosed by the Hart et al. reference, does not exist for gate opening purposes.

All components of the gate 40 illustrated in FIGS. 2-10 are preferably made of galvanized steel, unless otherwise indicated, and abutting galvanized steel parts that are connected together are welded, unless otherwise indicated. Consequently, the materials are relatively inexpensive, commonly available and have long life.

Gate 40, as illustrated in FIGS. 2-5, includes vertical, tubular posts 42 and 44, spaced from each other by a distance sufficient to enable cow 46 to pass between them, and having sufficient height to enable the cow to pass under the posts.

At the top of posts 42 and 44 are annular buckles 48 and 50 that are secured to the posts by nut and bolt arrangements 52 and 54, respectively. Buckles 48 and 50 fixedly carry aligned circular collars 60 and 68 including end plates 160 and 162 having aligned circular openings into which fit opposite ends of tube 56 (FIGS. 4, 5 and 6C), having a circular cross section. Tube 56 is fixed as a result of its fixed connection to end plates 160 and 162. Tube 56 carries turntable spacer tubes 62-66.

Spacer tubes 62-66 are concentric with tube 56 and are free to turn about a common axis of tubes 56 and 62-66.

Collars 60 and 68 and spacer tubes 62-66 are located along different regions of tube 56, so that fixed collars 60 and 68 are at the opposite ends of tube 56, turntable tube 64 is in the center of tube 56, turntable tube 62 is between collar 60 and tube 64, and turntable tube 66 is between tube 64 and collar 68. The ends of tubes 62-66 include soft, plastic, resilient, end caps 69 that engage the back, reduce friction and facilitate turning of tubes 62-66.

Figure 2:
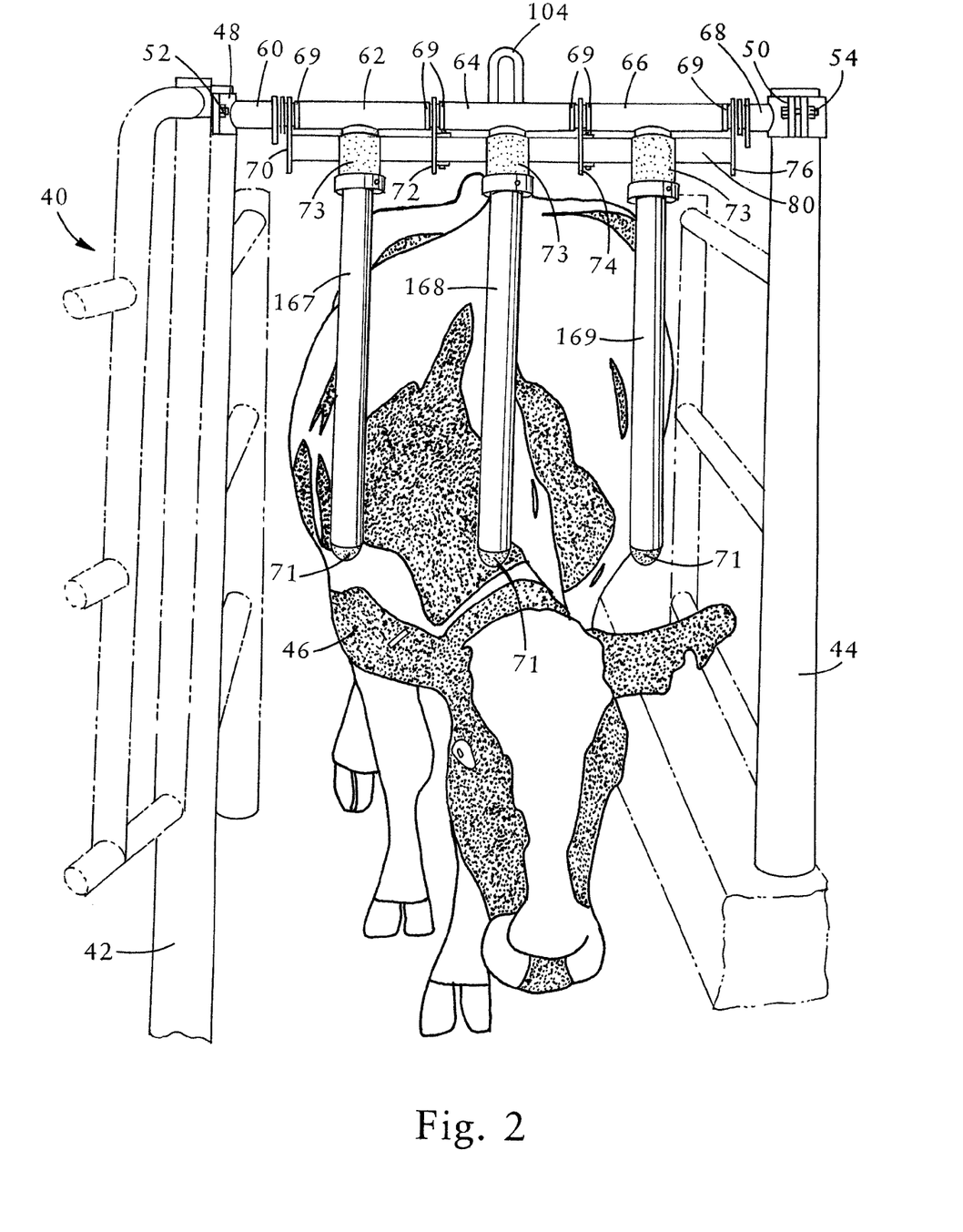
FIG. 2 is a front view of a gate in accordance with a preferred embodiment of the present invention, wherein the gate of FIG. 2 replaces gates 24, 26, 28 and 30 of FIG. 1 and is responsive to a cow pushing against a barrier of the gate that swings about a horizontal axis.
Figure 3:
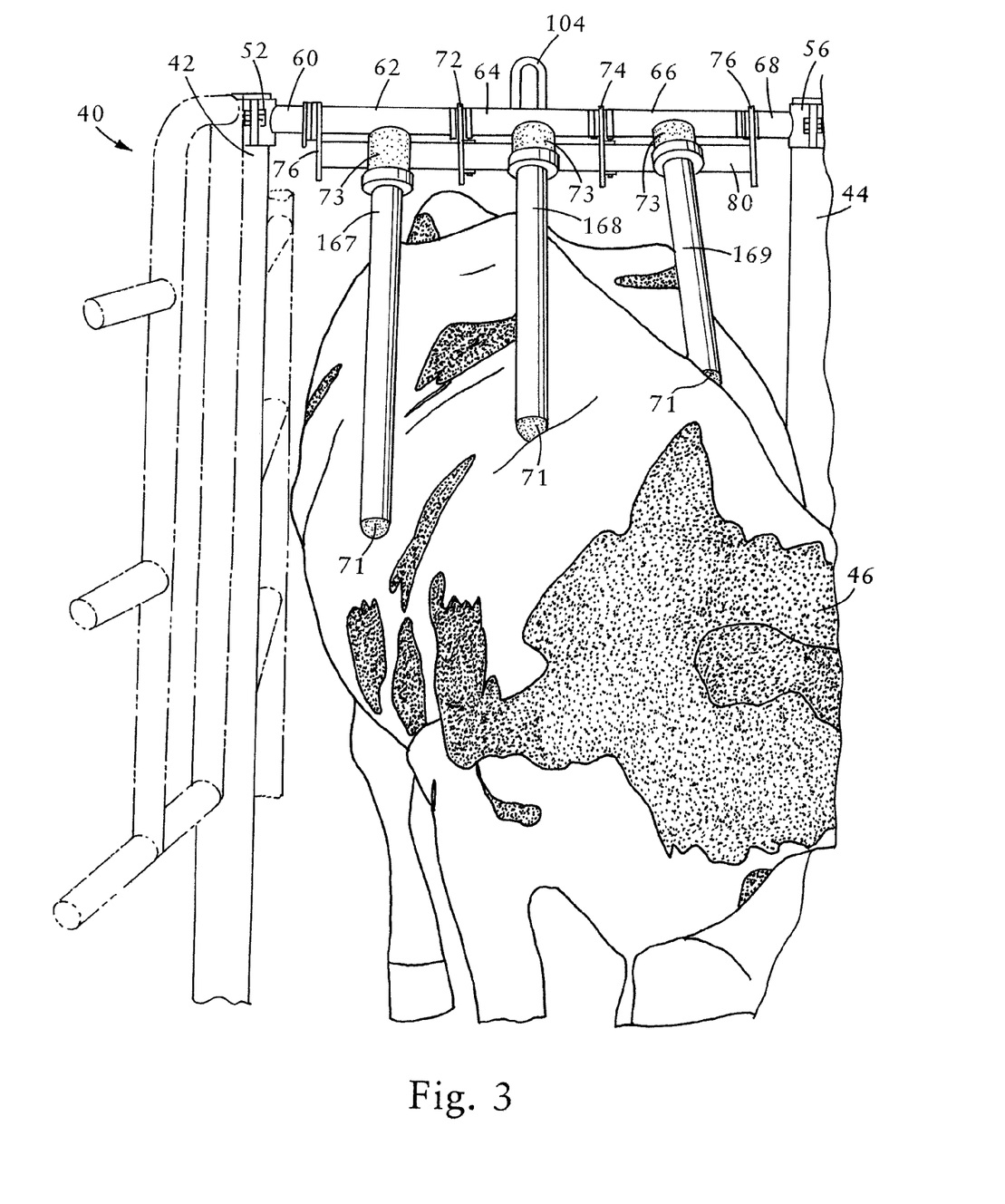
FIG. 3 is a front view of the gate illustrated in FIG. 1, wherein a cow has partially opened the gate by pushing against the barrier.
Figure 4:
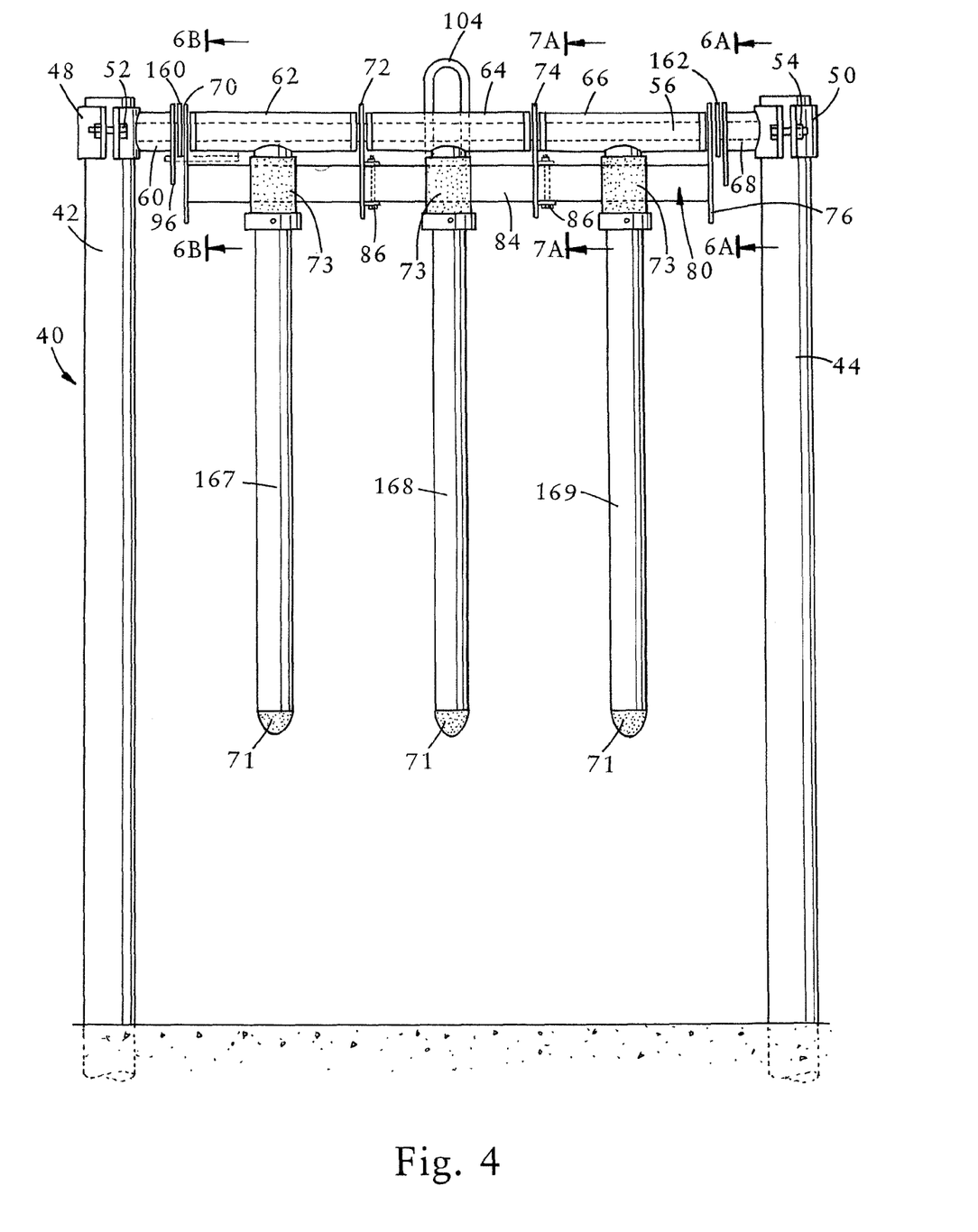
FIG. 4 is a front view of the gate illustrated in FIGS. 2 and 3.
Figure 5:
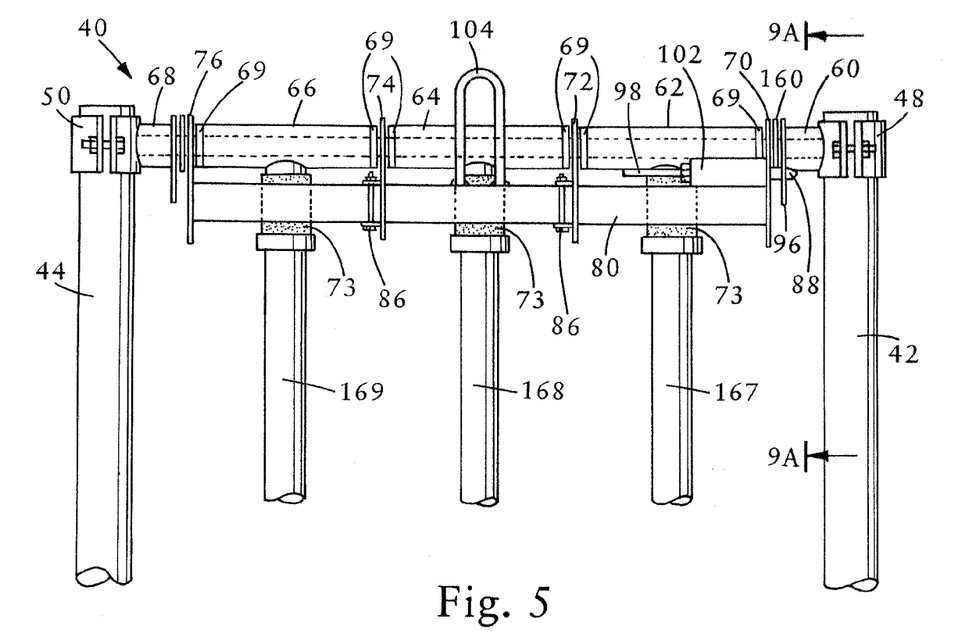
FIG. 5 is a back view of the gate illustrated in FIG. 4.

A barrier that enables only one way movement of a cow through gate 40 includes tubular tines 167, 168 and 169, respectively fixedly mounted on turntable spacer tubes 62, 64 and 66. In the quiescent, normal (non-training mode) position of the barrier, tines 167-169 depend downwardly from tubes 62, 64 and 66 and are long enough that the tines hang down from the tubes by sufficient distance to be at a quiescent position that is below the top of the back of a cow passing through gate 40, as illustrated in FIGS. 2 and 3. As the cow pushes against tines 167-169, the cow usually drops her head below the bottoms of tines 167-169 and walks in a normal manner through gate 40 while the back of the cow engages tines 167-169, to cause the tines to turn about the common axis of tubes 62-66.

Gate 40 is arranged so that tines 167-169 can be pushed in only one direction by the cow, to enable the cow to move from pen 12 to robotic milker 14, thence back to pen 12. In other words, in the arrangement of FIG. 1, wherein a gate 40 replaces gate 24, tines 167-169 can turn only from pen 12 toward entry portion 18 of passage 16 in response to a cow walking from pen 12 toward robotic milker 14. Similarly, the gate 40 that replaces gate 26 can turn only from passage portion 18 toward passage portion 22 where robotic milker 14 is located in response to the cow moving from passage portion 18 into passage portion 22. After the cow has been milked by robotic milker 14, the gate 40 that replaces gate 28 can turn only from passage portion 22 toward passage portion 20 in response to the cow moving from robotic milker 14 into exit portion 20. Similarly, gate 40 that replaces gate 30, can turn only from exit portion 20 toward cow pen 12 as the cow moves from exit portion 20 to the pen. Gate 40 is arranged so that after the cow has moved through the gate, tines 167-169 swing back to the quiescent position; the quiescent position for a fully trained herd of cows is with tines 167-169 extending in the vertical plane downwardly from tubes 62-66.

The ends of tines 167-169 remote from tubes 62-66 are capped by hemispherical, relatively soft, plastic pads 71 that contact the backs of the cows as the cows move through gate 40. Pads 71 prevent injury to the backs of the cows that the pads engage.

Tube 56 also carries plates 70-76, having circular apertures through which tube 56 extends. Plate 70 is between collar 60 and tube 62, plate 72 is between tubes 62 and 64, plate 74 is between tubes 64 and 66, and plate 76 is between tube 66 and collar 68. Each of plates 70-76 includes a portion that extends below tube 56 and has a square aperture 78. Tube 80, having a square outer perimeter fits into apertures 78 and is fixedly held in place relative to plates 70-76 and tube 56 by nut and bolt assemblies 82.

In the quiescent position, the upper portions of tines 167-169 bear against tube 80 that acts as a stop to prevent the cows from turning the tines in the wrong direction.

The ends of tines 167-169 in proximity to tubes 62-66 include tubular, plastic pads 73 that are held in place by rings 75 and are relatively soft, resilient and sound absorbing, to prevent damage to the tines and the surface of tube 80 that the rings engage in the quiescent position of the tines; rings 75 also reduce the noise that occurs in response to the tines hitting tube 80. Tube 80 is fixedly mounted on shaft 56 so the cows can not turn tines 167-169 in the wrong direction, when the tines are in the quiescent position. After the cows have moved through gate 40 and tines 167-169 turn back to the quiescent location, tubular pads 73 contact tube 80.

Figure 6A:
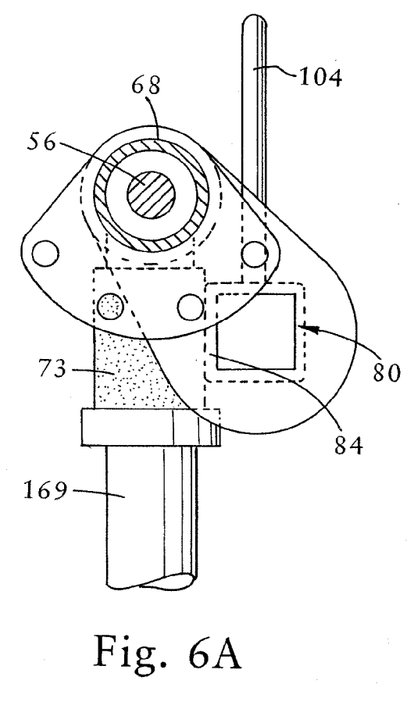
FIGS. 6A and 6B are side views respectively taken through the lines 6A-6A, FIGS. 4, and 6B-6B, FIG. 4.
Figure 6B:
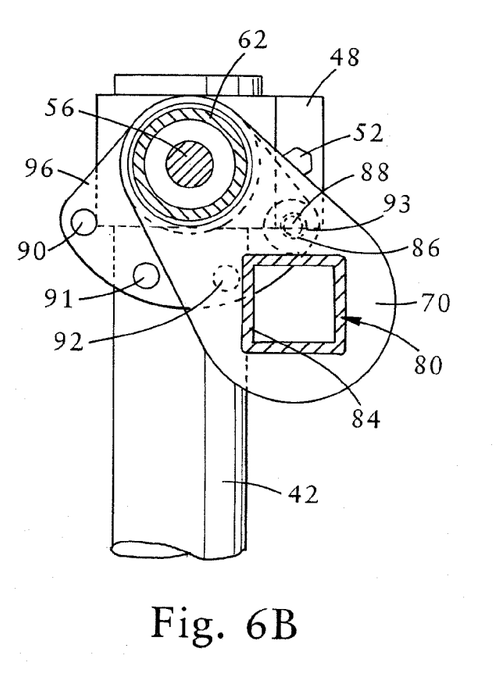
Figure 6C:
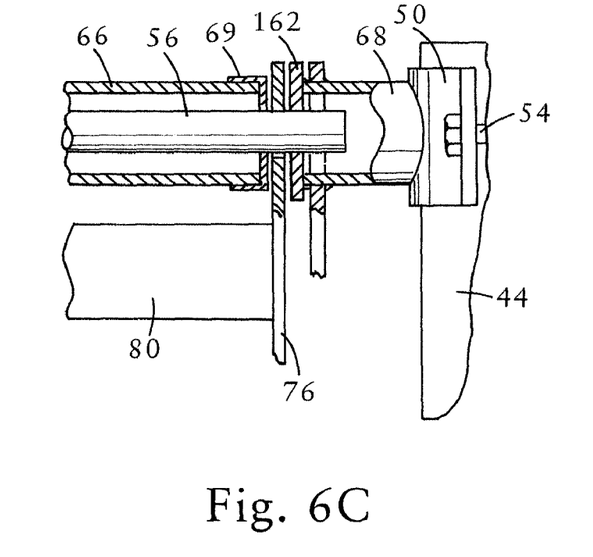
FIG. 6C is a partial sectional view of the structure illustrated in FIG. 4.
Figure 7A:
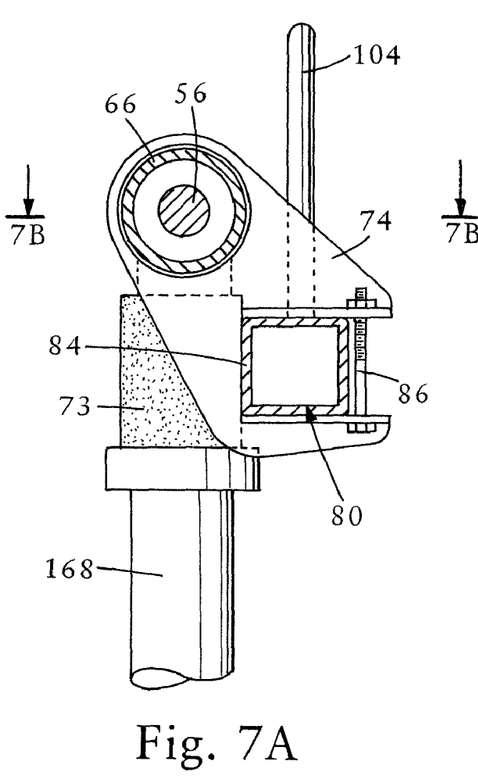
FIG. 7A is a side view and partial sectional view taken through the lines 7A-7A, FIG. 4.
Figure 7B:
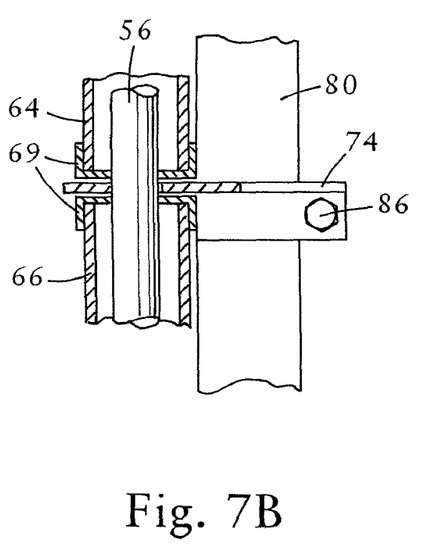
FIG. 7B is a sectional view taken through the lines 7B-7B, FIG. 7A.
Figure 8A:
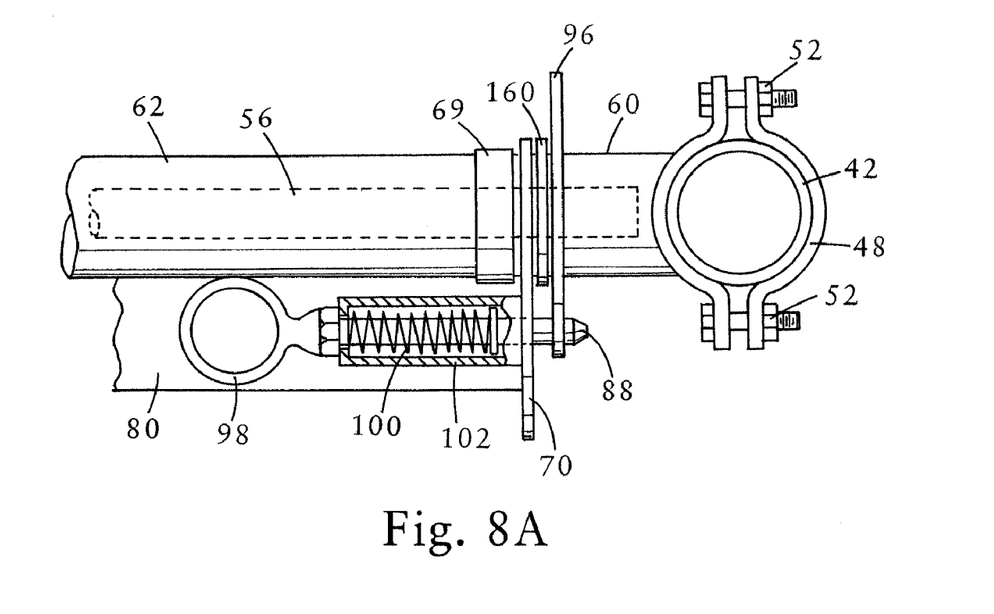
FIG. 8A is a top view of a spring bias pin on the gate, as illustrated in FIG. 5, for holding the plate illustrated in FIG. 6A in place at different angular positions.
Figure 8B:
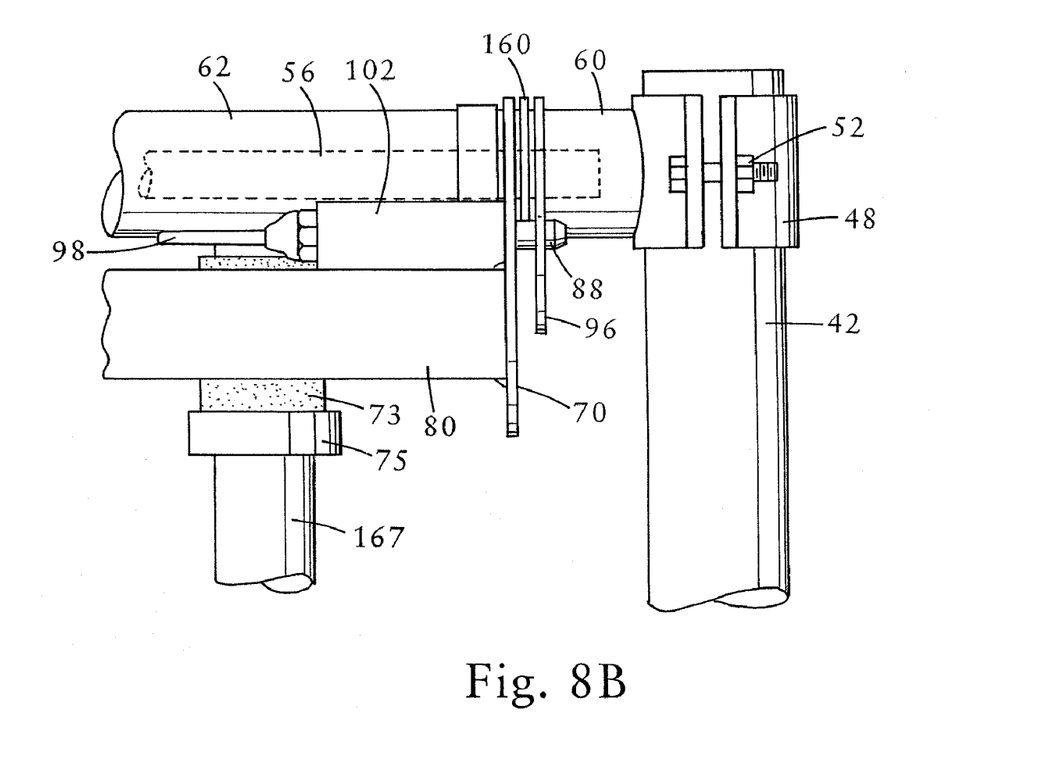
FIG. 8B is a front view of structure illustrated in FIG. 8A.
Figure 10:
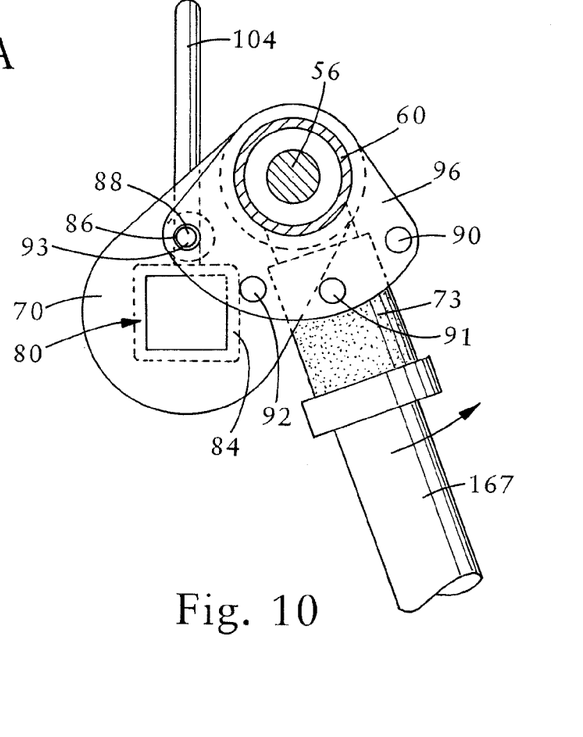
FIG. 10 is a view of the structure illustrated in FIG. 9A, but wherein a tine of a barrier of the gate has started to turn as a result of a cow pushing against the tine.

In normal operation, the quiescent position of tines 167-169 is in the vertical plane, as illustrated in FIGS. 6A and 7A. Under these circumstances, tube 80 is positioned such that the outer vertical wall 84 thereof engages pads 73. In response to cow 46 pushing against tines 167-169, pads 71 at the ends of tines 167-169 engage the back of the cow, causing tines 167-169 to turn away from vertical edge 84, in the direction the cow moves, as illustrated in FIG. 10. Tines 167-169 continue to turn until they reach a zenith along the rear side of cow 46. After cow 46 has walked so its rear side is no longer engaging pads 71, tines 167-169 turn in the opposite direction and the tines slam against wall 84 of tube 80. The cow is not frightened by tines 167-169 slamming against wall 84 because of the sound absorbing properties of soft pads 73.

If cow 46 attempts to go from pen 12 to robotic milker 14 through exit portion 20 of passage 16, gate 40 does not permit such movement because of the fixed position of tube 80 and the abutting relationship of pads 73 against the vertically extending wall 84 of tube 80. Hence, the one-way gate arrangement enables the cow to move only from pen 12 to robotic milker 14 by way of entry portion 18 of passage 16 and the cow is prevented from getting to the milker by way of exit portion 20 of passage 16.

I have observed that a significant number of cows are unwilling to push against tines 167-169 when the tines are in the vertical position under quiescent conditions. I have also determined that this problem can be overcome by training the cows to walk through the barrier formed by tines 167-169 by initially positioning the tines, during a training period, at an angle that is removed from the vertical, such that the tines point in the direction the cow is to move from pen 12 towards robotic milker 14 and from robotic milker 14 toward pen 12. During the training period, the free ends of the tines, where pads 71 are located, are initially above the heads of the cows but below the backs of the cows.

Figure 9A:
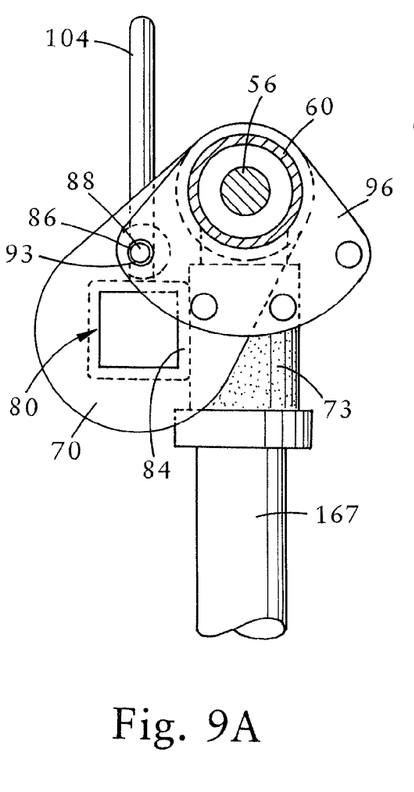
FIG. 9A is a side view, taken through the lines 9A-9A, FIG. 5.
Figure 9B:
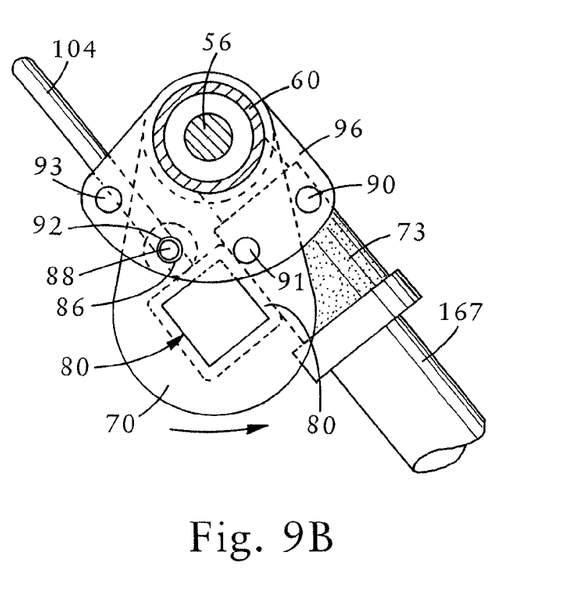
FIG. 9B is a view of the structure illustrated in FIG. 9A, but wherein the pin illustrated in FIG. 8A is in a different hole of the plate illustrated in FIG. 9A from the hole illustrated in FIG. 9A.

The quiescent location of tines 167-169 during the training period can be changed from the vertical position to the foregoing initial position by turning tube 80 so that wall 84 thereof is at an angle that is displaced from the vertical by a predetermined amount, as indicated by FIG. 9B. To change the quiescent angle of tines 167-169 from the vertical to some other angle, plate 70 includes circular opening 86 through which horizontally extending spring biased pin 88 extends, except when the angular position of tines 167-169 is being changed. Pin 88 also extends through one of holes 90-93 in plate 96 that is fixedly mounted on the wall of collar 60. (A similar, non functional plate is carried by collar 68, to reduce the number of different parts of the gate.) The end of pin 88 remote from plates 70 and 96 is connected to handle 98. Pin 88 is biased toward plates 70 and 96 by compression spring 100, captured by the sidewall and end plate of cylinder 102 that is fixedly mounted on plate 70.

To assist in turning tube 80 so that tines 167-169 can be at different quiescent positions, tube 80 carries handle 104 that is centrally located on tube 80 and is fixedly mounted to the tube.

To change the quiescent position of tines 167-169 from the vertical to an initial training location that is conducive to the cows moving through gate 40, during the initial training period, an operator pulls on handle 98 to remove pin 88 from holes 86 and 93 in plates 70 and 96, respectively. After the operator has pulled pin 88 from holes 86 and 93, the operator grasps handle 104 and pulls the handle down, to turn tube 80 from the position shown in FIGS. 6A, 6B and 7A to a position where holes 86 and 91 are aligned, at which time the operator releases handle 98 and pin 88 goes through holes 86 and 91. This causes the quiescent position of tines 167-169 to be displaced by approximately 45° from the vertical, in the desired direction for the cow to walk. Based on observations, it has been found that the cows readily walk through gate 40 under this condition that does not permit the cows to walk in the wrong direction. As a result of the cows walking through gate 40 under this condition, the cows become accustomed to having tine tips 71 engage their backs. After the cows have been trained to walk through the gate at the 45° angle, the operator again pulls on handle 98, while holding handle 104 and then aligns holes 86 and 92, as illustrated in FIG. 9B. Under these conditions, the quiescent angle of tines 167-169 is approximately 30° from the vertical plane.

After the cows have become accustomed to this condition, holes 86 and 93 are aligned, causing the quiescent angle of tines 167-169 to be approximately 15°. After the cows have become fully trained, pin 88 is inserted through holes 86 and 93 and tines 167-169 are in a vertical position under quiescent conditions. I have also found that in many instances, it is not necessary, during training, to employ the tine angles associated with holes 91 and 92. The cows often become fully trained by using only the training angle associated with hole 91 or with the vertical tine position associated with hole 93.

Sometimes it is necessary to bring a cow through the gate of FIGS. 2-10 in a direction opposite to that illustrated in FIGS. 1-3. In such an instance, tines 167-169 are raised above the head of the cow to a horizontal plane by turning handle 104 so holes 86 and 90 are aligned and pin 88 goes through these holes. To this end, the centers of holes 90 and 93 are equidistant from the center of shaft 56 and displaced 900 from each other along a circular arc having its origin at the center of shaft 56.

While a specific embodiment of the invention has been described and illustrated, variations regarding details of the embodiment specifically illustrated and described may be made without departing from the true spirit and scope of the invention as defined in the appended claims.

What is claimed is:

1. A gate for domestic farm animals comprising a support, a barrier for the animals carried by the support, the support and barrier being arranged for enabling the barrier to turn about a horizontal axis from a quiescent position in only a first direction in response to the animal pushing against the barrier, the barrier including plural tines that can turn independently of each other in the first direction about the horizontal axis, the tines and the support being arranged so: (a) the animal must pass through the gate in the first direction to reach a destination, (b) as the animal passes through the gate in the first direction, the animal pushes against the tines to turn the tines in the first direction to raise the tines from the quiescent position to another position that is sufficiently high as to enable the animal to pass under the tines, and (c) after the animal has passed through the gate the tines have returned to the quiescent position, the horizontal axis, the support and the tines being arranged so that the animal can walk through the barrier while moving its legs in a normal walking manner, the tines having free ends positioned such that the heads of the animals can pass under the free ends only as a result of the animals ducking their heads lower than the usual positions thereof, the tines being arranged so the quiescent position is settable to plural planes relative to a vertical plane, one of the planes being the vertical plane.

2. The gate of claim 1 wherein one of the planes is a horizontal plane.

3. A gate for domestic farm animals comprising a support, a barrier for the animals carried by the support, the support and barrier being arranged for enabling the barrier to turn about a horizontal axis from a quiescent position in only a first direction in response to the animal pushing against the barrier, the barrier including plural tines that can turn independently of each other in the first direction about the horizontal axis, the tines and the support being arranged so: (a) the animal must pass through the gate in the first direction to reach a destination, (b) as the animal passes through the gate in the first direction, the animal pushes against the tines to turn the tines in the first direction to raise the tines from the quiescent position to another position that is sufficiently high as to enable the animal to pass under the tines, and (c) after the animal has passed through the gate the tines have returned to the quiescent position, the horizontal axis, the support and the tines being arranged so that the animal can walk through the barrier while moving its legs in a normal walking manner, the tines having free ends positioned such that the heads of the animals can pass under the free ends only as a result of the animals ducking their heads lower than the usual positions thereof, a horizontally mounted bar that the tines engage while in the quiescent position, the bar being arranged to prevent turning of the tines about the horizontal axis in the second direction from the quiescent position, the bar being selectively turnable to plural vertical positions relative to the axis for controlling the angle of the quiescent position relative to the vertical position of the horizontal axis.

4. The gate of claim 3 wherein one of the angles causes the quiescent position to be in the vertical plane.

5. The gate of the claim 3 wherein the bar carries a horizontally displaceable spring loaded pin for selectively engaging openings in a fixed, vertically disposed plate, the openings being at angles corresponding to the plural angles of the quiescent position.

6. A gate for domestic farm animals comprising a support, a barrier for the animals carried by the support, the support and barrier being arranged for enabling the barrier to turn about a horizontal axis from a quiescent position in only a first direction in response to the animal pushing against the barrier, the barrier including plural tines that can turn independently of each other in the first direction about the horizontal axis, the tines and the support being arranged so: (a) the animal must pass through the gate in the first direction to reach a destination, (b) as the animal passes through the gate in the first direction, the animal pushes against the tines to turn the tines in the first direction to raise the tines from the quiescent position to another position that is sufficiently high as to enable the animal to pass under the tines, and (c) after the animal has passed through the gate the tines have returned to the quiescent position, wherein the quiescent position is in a vertical plane, wherein the barrier includes a plate in a vertical plane, the plate having a number of openings at different vertical positions corresponding to settable quiescent positions, and a horizontally translatable pin for selectively fitting into the openings.

7. A milking facility for domestic farm animals, the facility including a milking area, a pen area, a first passage leading from the pen area to the milking area, a second passage leading from the milking area to the pen area, the first passage including a first domestic farm animal gate, the second passage including a second of domestic farm animal gate, the first passage and the first gate being arranged so that the animals must walk through the first gate in order to get from the pen area to the milking area, the second passage and second gate being arranged so that the animals must walk through the second gate in order to get from the milking area to the pen area, each of the domestic farm animal gates including: a support, a barrier for the animals carried by the support, the support and barrier being arranged for enabling the barrier to turn about a horizontal axis from a quiescent position in only a first direction in response to the animal pushing against the barrier, the barrier including plural tines that can turn independently of each other in the first direction about the horizontal axis, the tines and the support of the first and second gates being respectively arranged so: (a) the animals must pass through the first and second gates in the first direction to reach the milking area and the pen area, (b) as the animal passes through the gate in the first direction, the animal pushes against the tines to turn the tines in the first direction to raise the tines from the quiescent position to another position that is sufficiently high as to enable the animal to pass under the tines, and (c) after the animal has passed through the gate the tines have returned to the quiescent position.

8. The facility of claim 7 wherein the tines are arranged to turn by gravity in a second direction, opposite to the first direction, about the horizontal axis to the quiescent position after the animal has passed through the barrier.

9. A method of training a domestic farm animal to walk through a one-way gate having a barrier, the gate being arranged such that, in a normal, non-training mode:
   (a) the barrier has a quiescent position in a vertical plane and turns in a first direction about a horizontal axis in response to the animal pushing against the gate
   (b) the gate turns in a second direction about the horizontal axis so it again has a quiescent position in the vertical plane after the animal has walked through the gate,
   the method comprising turning the barrier in the first direction to an angle removed from the vertical plane so that, as the animal approaches and initially pushes against the barrier, the barrier does not contact the head of the animal, but contacts the back of the animal, and
   after the animal has walked through the gate with the barrier in the turned position a sufficient number of times that the animal willingly walks through the gate, positioning the barrier so the barrier has a quiescent position in the vertical plane.

10. The method of claim 9 wherein the barrier is initially at a first large angle relative to the vertical plane,
    after the animal has walked through the gate with the barrier at the first angle a sufficient number of times that the animal willingly walks through the gate, positioning the barrier at a second angle relative to the vertical plane, the second angle being less than the first angle,
    after the animal has walked through the gate with the barrier at the second angle a sufficient number of times that the animal willingly walks through the gate, positioning the barrier so the barrier is in the vertical plane and a bottom portion of the barrier is below the normal position of the head of the animal.

11. A gate for domestic farm animals comprising a support, a barrier for the animals carried by the support, the support and barrier being arranged for enabling the barrier to turn about a horizontal axis from a quiescent position in only a first direction in response to the animal pushing against the barrier, the barrier including plural tines that can turn independently of each other in the first direction about the horizontal axis, the tines and the support being arranged so: (a) the animal must pass through the gate in the first direction to reach a destination, (b) as the animal passes through the gate in the first direction, the animal pushes against the tines to turn the tines in the first direction to raise the tines from the quiescent position to another position that is sufficiently high as to enable the animal to pass under the tines, and (c) after the animal has passed through the gate the tines have returned to the quiescent position, the support and the tines being arranged, during normal operation of the gate, so that the tines cannot turn in a second direction from the quiescent position, the second direction being opposite the first direction, the support including a structure for enabling the tines to be selectively turned in the second direction from the quiescent position.

* * * * *